United States Patent [19]
Petri et al.

[11] Patent Number: 5,591,097
[45] Date of Patent: Jan. 7, 1997

[54] TRANSMISSION WITH A COUNTERSHAFT AND A PLANETARY REDUCTION GEAR UNIT

[75] Inventors: Hans Petri, Much, Germany; Steven G. Thomas, Bloomfield Hills, Mich.

[73] Assignee: Ford Motor Company, Dearborn, Mich.

[21] Appl. No.: 567,695

[22] Filed: Dec. 5, 1995

[30] Foreign Application Priority Data

Nov. 15, 1994 [DE] Germany .......................... 44 40 710.6

[51] Int. Cl.$^6$ .............................. F16H 37/04; B60K 17/08
[52] U.S. Cl. ................................ 475/207; 74/331; 74/325
[58] Field of Search ................................... 475/207, 208, 475/209; 74/325, 330, 331

[56] References Cited

U.S. PATENT DOCUMENTS

| | | | |
|---|---|---|---|
| Re. 33,336 | 9/1990 | Bainbridge et al. | 74/330 |
| 1,988,636 | 1/1935 | Thomas et al. | 476/47 |
| 2,072,380 | 3/1937 | Pfeiffer et al. | 74/606 |
| 2,127,353 | 8/1938 | Fishburn et al. | 74/328 |
| 2,127,354 | 8/1938 | Fishburn et al. | 74/328 |
| 2,138,028 | 11/1938 | Dooley | 74/328 |
| 2,242,276 | 5/1941 | Vincent | 74/328 |
| 2,254,334 | 9/1941 | Vincent | 74/328 |
| 2,514,158 | 7/1950 | Hussain | 475/207 |
| 2,576,478 | 11/1951 | Beckwith | 475/207 |
| 2,592,210 | 4/1952 | Swennes | 475/207 |
| 2,768,534 | 10/1956 | Orr | 475/207 |
| 2,787,919 | 4/1957 | Senkowski et al. | 475/207 |
| 3,396,610 | 8/1968 | Rich, Jr. et al. | 475/207 |
| 3,429,202 | 2/1969 | Galicher | 475/207 |
| 3,468,192 | 9/1969 | Nasvytis | 475/207 |
| 3,554,054 | 1/1971 | Nasvytis | 475/207 |
| 3,572,167 | 3/1971 | Bosko et al. | 475/207 |
| 3,589,483 | 6/1971 | Smith | 74/331 |
| 3,654,822 | 4/1972 | Singer et al. | 475/207 |
| 3,673,890 | 7/1972 | Crooks | 475/207 |
| 3,837,237 | 9/1974 | Rossler et al. | 475/207 |
| 4,094,206 | 6/1978 | Sogo et al. | 74/360 |
| 4,282,775 | 8/1981 | Van Dest | 74/360 X |
| 4,368,650 | 1/1983 | Numazawa et al. | 475/207 |
| 4,403,526 | 9/1983 | Numazawa et al. | 475/207 X |
| 4,416,168 | 11/1983 | Arai et al. | 475/207 |
| 4,611,504 | 9/1986 | Rundle | 74/342 |
| 4,615,240 | 10/1986 | Weiss | 74/359 X |
| 4,823,628 | 4/1989 | Hiraiwa | 74/330 |
| 5,390,559 | 2/1995 | Thomas et al. | 74/325 |
| 5,458,014 | 10/1995 | Thomas et al. | 74/325 |

FOREIGN PATENT DOCUMENTS

| | | |
|---|---|---|
| 0541023 | 5/1993 | European Pat. Off. . |
| 2518200 | 6/1983 | France . |
| 921729 | 12/1954 | Germany . |
| 1580056 | 7/1970 | Germany . |
| 2708524 | 8/1978 | Germany . |
| 3415479 | 10/1985 | Germany . |
| 3432193 | 3/1986 | Germany . |
| 4000833 | 7/1991 | Germany . |
| 4109832 | 10/1992 | Germany . |

*Primary Examiner*—Khoi Q. Ta
*Attorney, Agent, or Firm*—Frank G. McKenzie; James J. Dottavio

[57] ABSTRACT

In a transmission with a countershaft and a planetary reduction gear unit, particularly for automobiles, having an input shaft (1) an output shaft (2), an intermediate shaft (23) fixed and loose pinions and gears which are in constant mesh alternately with one another and are releasably connectable to the shafts. The planetary reduction gear unit (28) comprises a ring gear (30) fixed against rotation, a sun wheel (33) driven by way of a set of pinions and gears and mounted on the intermediate shaft (23) and a planet carrier (32) connected to the output shaft. A member of a pinion-gear pair (16) is carried by the intermediate shaft (23) and is releasably connectable to the intermediate shaft (23) and the output shaft (2).

6 Claims, 3 Drawing Sheets

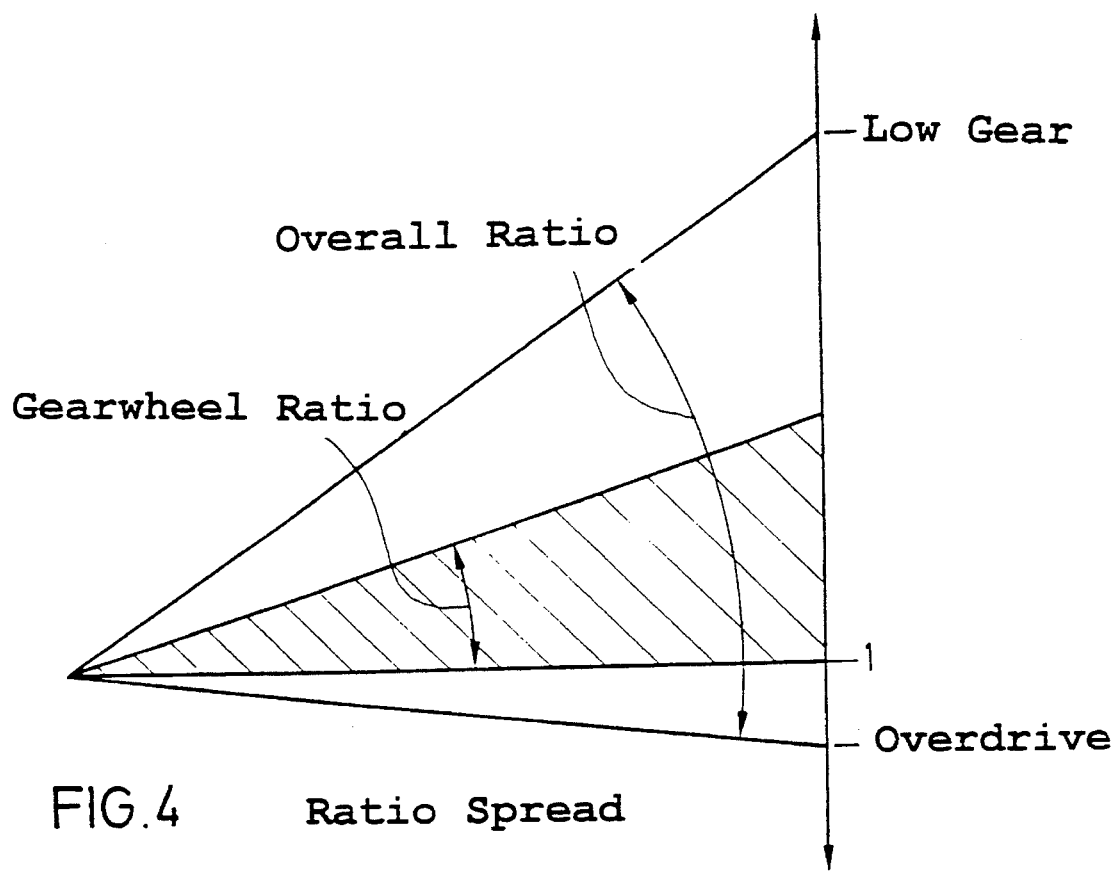
FIG.4    Ratio Spread
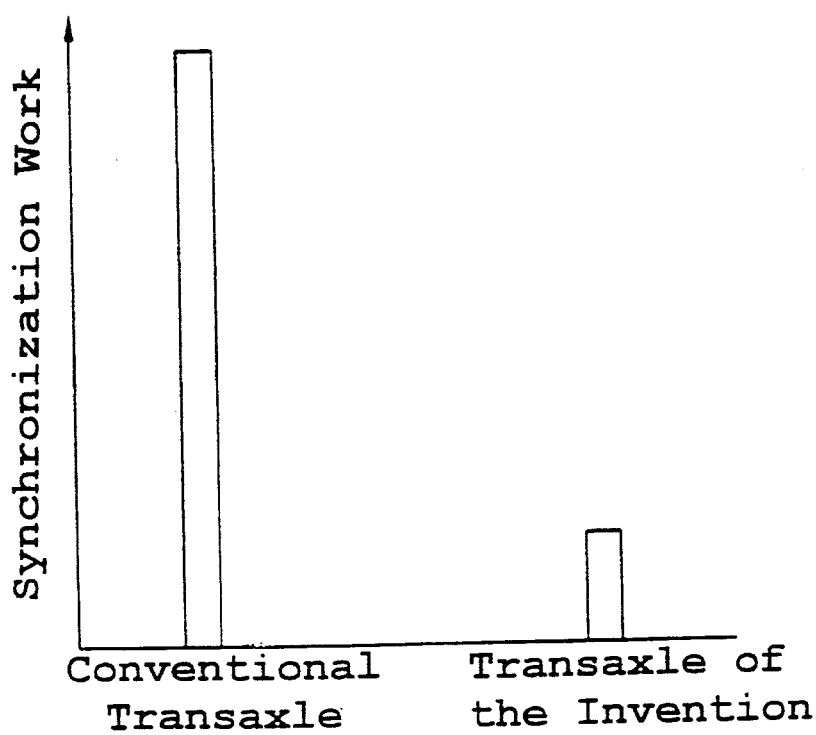
FIG.5

5,591,097

TRANSMISSION WITH A COUNTERSHAFT AND A PLANETARY REDUCTION GEAR UNIT

BACKGROUND OF THE INVENTION

1. Field of the Invention

The invention relates to a transmission with a countershaft and a planetary reduction gear unit for an automobile.

2. Description of the Prior Art

German Offenlegungsschrift 34 15 479 ('479) describes a manual transmission with a countershaft and a planetary reduction gear unit. The transmission in the '479 patent has fixed and loose pinions and gears which form pinion and gear pairs that are in constant mesh with one another and which are supported by, and driveably connectable to, an input shaft and countershaft or output shaft by synchronisers mounted on the shafts to select the individual gears. The planetary reduction gear unit of the '479 patent comprises a ring gear fixed in the transmission housing, a sun wheel driven by way of a pinion and gear pair and mounted on a sleeve shaft concentrically embracing the output shaft, and a planet pinion carrier connected to the output shaft.

In the manual transmission of the '479 patent there is provided, in addition to the sleeve shaft carrying the sun wheel, a further sleeve shaft carrying further a fixed pinion and gear and a loose gear adjacent a synchroniser. This additional sleeve shaft is connectable to the sleeve shaft of the sun wheel. Furthermore this further sleeve shaft is connectable to the output shaft through a fixed pinion carried on the sleeve shaft and through a synchroniser carried on the output shaft.

In the '479 manual transmission it is stated that because the subsequent planetary reduction gear unit enables the reduction ratios of the individual pairs of pinions and gears to be made smaller, the overall design of the transmission can be more compact.

SUMMARY OF THE INVENTION

It is an object of the invention to provide an improved transmission having a countershaft and a planetary reduction gear unit, particularly for automobiles, which can be used as a transaxle for a front-wheel drive unit mounted transversely in the vehicle, wherein the effort required for synchronisation in gear shifting, particularly in the case of the lower gears, can be substantially reduced, so that on the one hand gear shifting becomes easier and on the other hand an unnecessarily high constructional outlay for the synchronisers can be avoided.

To this end, in accordance with the invention, in a transmission of the kind referred to, adjacent the synchroniser carried on the sleeve shaft of the sun wheel, a loose pinion or gear is provided which has synchroniser devices arranged on either side of it, one synchroniser being carried on the output shaft adjacent the sleeve shaft of the sun wheel, so that the loose pinion or gear on the sleeve shaft can be connected to the sleeve shaft via one synchroniser to produce a second gear ratio and be connected to the output shaft via another synchroniser to produce a fifth gear ratio.

Advantageously a further loose pinion or gear is supported on the output shaft adjacent the first synchroniser and is in constant mesh with a pinion or gear on the input shaft in order to provide an overdrive sixth gear.

BRIEF DESCRIPTION OF THE DRAWINGS

FIG. 4 is a diagram showing the spread of the ratios of the various gears;

FIG. 5 is a diagram showing the substantially reduced work required for synchronisation compared with a is conventional transaxle transmission.

DESCRIPTION OF A PREFERRED EMBODIMENT OF THE INVENTION

Figure 1:
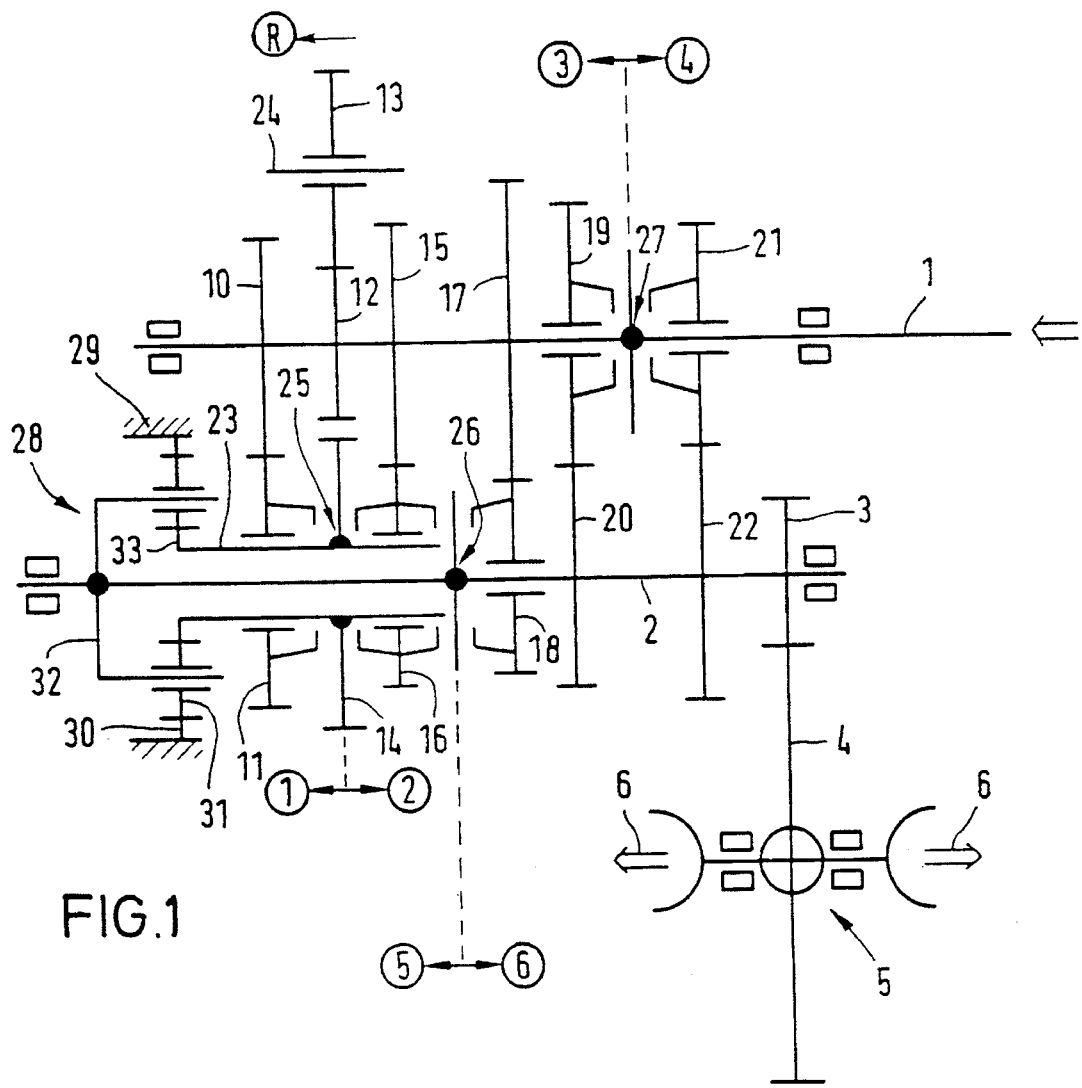
FIG. 1 shows a schematic diagram of a manual transmission in accordance with the invention having six forward gears and one reverse gear.

The invention will now be described in more detail, by way of example, with reference to a preferred embodiment shown in the drawings.

The manual transmission shown in FIGS. 1 to 5, particularly for automobiles, having a countershaft and planetary reduction gear unit, is designed as a transaxle in which, disposed parallel to an input shaft 1, there is a countershaft 2 which at the same time forms the output shaft and which, via a final gear consisting of a pinion-gear pair 3 and 4, directly drives a differential unit 5 from which final drive shafts 6 for the front driving wheels of the automobile are driven.

The input shaft 1 and the countershaft/output shaft 2 each support a plurality of fixed and loose pinion and gear pairs, which are in constant meshing engagement with one another and consequently make available different gear ratios for the different gears.

The pairs of pinions and gears for the first forward gear, the second forward gear and the reverse gear are arranged with their fixed pinions or gears 10, 12 and 15 on the input shaft, while the loose pinions or gears 11 and 16 for the first and second gears are carried on a sleeve shaft 23 which embraces the output shaft 2 and also supports the pinion or gear 14 for the reverse gear, which is in constant engagement, via a reversing pinion or gear 13 supported on an idler shaft 24, with the pinion or gear 12 on the input shaft.

A fixed gear 17 for the sixth gear is carried on the input shaft 1 and the loose pinion 18 for the sixth gear is carried on the output shaft 2. Also carried on the output shaft 2 are fixed pinions or gears 20 and 22 for the third and fourth gears, which are in constant mesh with pinions or gears 19 and 21 carried loosely on the input shaft 1.

Between the loose pinions and gears 11 and 16 there is arranged a synchroniser 25, between the loose pinions or gears 16 and 18 a synchroniser 26, and between the loose pinions or gears 19 and 21 a synchroniser 27.

A planetary reduction gear unit 28 is mounted concentrically with the countershaft/output shaft 2. The planetary reduction gear unit 28 consists of a ring gear 30 which is fixed on the transmission housing 29 and is in constant meshing engagement with planet pinions 31 supported rotatably on a planet carrier 32 which is connected non-rotatably to the output shaft 2. The planet pinions 31 are also in constant meshing engagement with a sun wheel 33, which is carried on, and fixed to, the sleeve shaft 23 that concentrically embraces the output shaft 2.

In FIG. 1 the direction of shifting of the corresponding selector sleeve of a synchroniser is indicated by arrows, which lead to circles indicating the respective gear ratios that are produced.

To shift into the first gear the sleeve of synchroniser 25 is moved leftwards, thereby forming a driving connection from the pinion or gear 10 to the sleeve shaft 23 via the pinion or gear 11. The sleeve shaft 23 drives the sun wheel 33 and, because the ring gear 30 is fixed, the planet carrier 32, and with it the output shaft 2 fixed to it, rotates with a speed ratio which is the product of the speed ratios of the pinions or gears 10 and 11 and the reduction ratio of the planetary reduction gear unit 28.

To shift into the second gear the sleeve of synchroniser 25 is moved to the other side, thereby forming a connection between the pinion and gear pair 15, 16 which is in engagement therewith, and the sleeve shaft 23. Here, too, the overall speed ratio is again the product of the speed ratio of the pinion and gear pair 15, 16 and the reduction ratio of the planetary reduction gear unit 28.

To shift into the third and fourth gears the sleeve of synchroniser 27 is shifted in the first case to the one side and in the second case to the other side, thereby forming a driving connection between the output shaft 2 and on the one hand the pinion-gear pair 19, 20 and on the other hand the pinion-gear pair 21 and 22.

Shifting into the fifth and sixth gears is effected by means of the synchroniser 26 located on the output shaft 2, adjacent the sleeve shaft 23. Moving the synchroniser sleeve to the left (as seen in FIG. 1), forms a driving connection between the meshing pinion-gear pair 15, 16 and the output shaft 2. If the sleeve of synchroniser 26 is moved to the right (as seen in FIG. 1) a driving connection is made between the mutually meshing pinion-gear pair 17, 18 and the output shaft 2. In the present embodiment the gear ratios of the fifth and sixth gears are such that both of them already represent a kind of economy ratio or overdrive, i.e. a step-up gear ratio.

Figure 2:
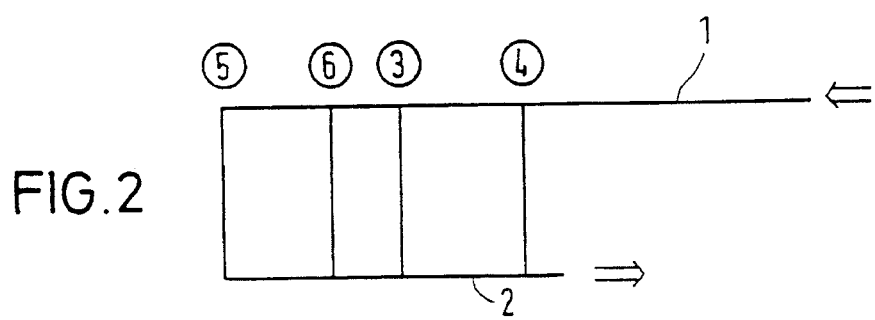
FIG. 2 shows a power flow diagram for the low-ratio gears 3, 4, 5 and 6.
Figure 3:
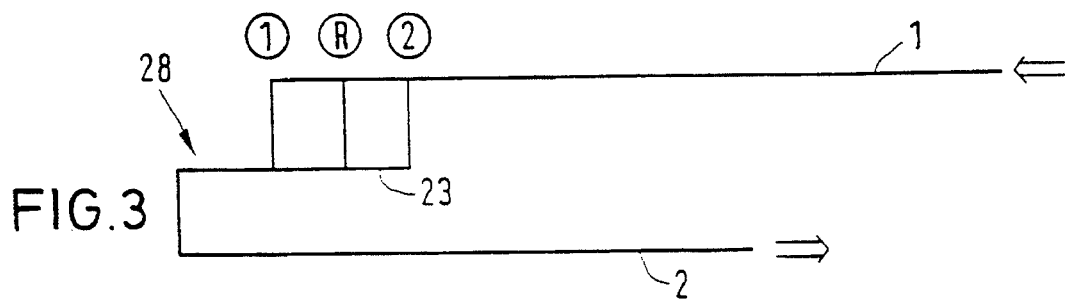
FIG. 3 shows a power flow diagram for the high reduction ratio gears 1, 2 and reverse.

As can be seen from FIGS. 2 and 3, the relatively low ratio gears 3, 4, 5 and 6 are selected without the planetary reduction gear unit set also being selected, whereas the high reduction ratio gears, namely first gear, second gear and reverse gear, are selected via the sleeve shaft 23 and the planetary reduction gear unit 28.

As can be seen from FIG. 4, which shows the spread of the gear ratios, the overall spread of the ratios between a low gear and an overdrive gear is made up of the product of the individual ratios of the pairs of pinions and gears and of the planetary reduction gear unit.

As can be seen from FIG. 5, the work of synchronisation required for shifting a transaxle transmission of conventional design, compared with a transaxle in accordance with the invention, is reduced by about three-quarters, since the smaller diameter of the pinions and gears which have to be braked during the synchronisation decreases their mass by about one power.

Figure 6:
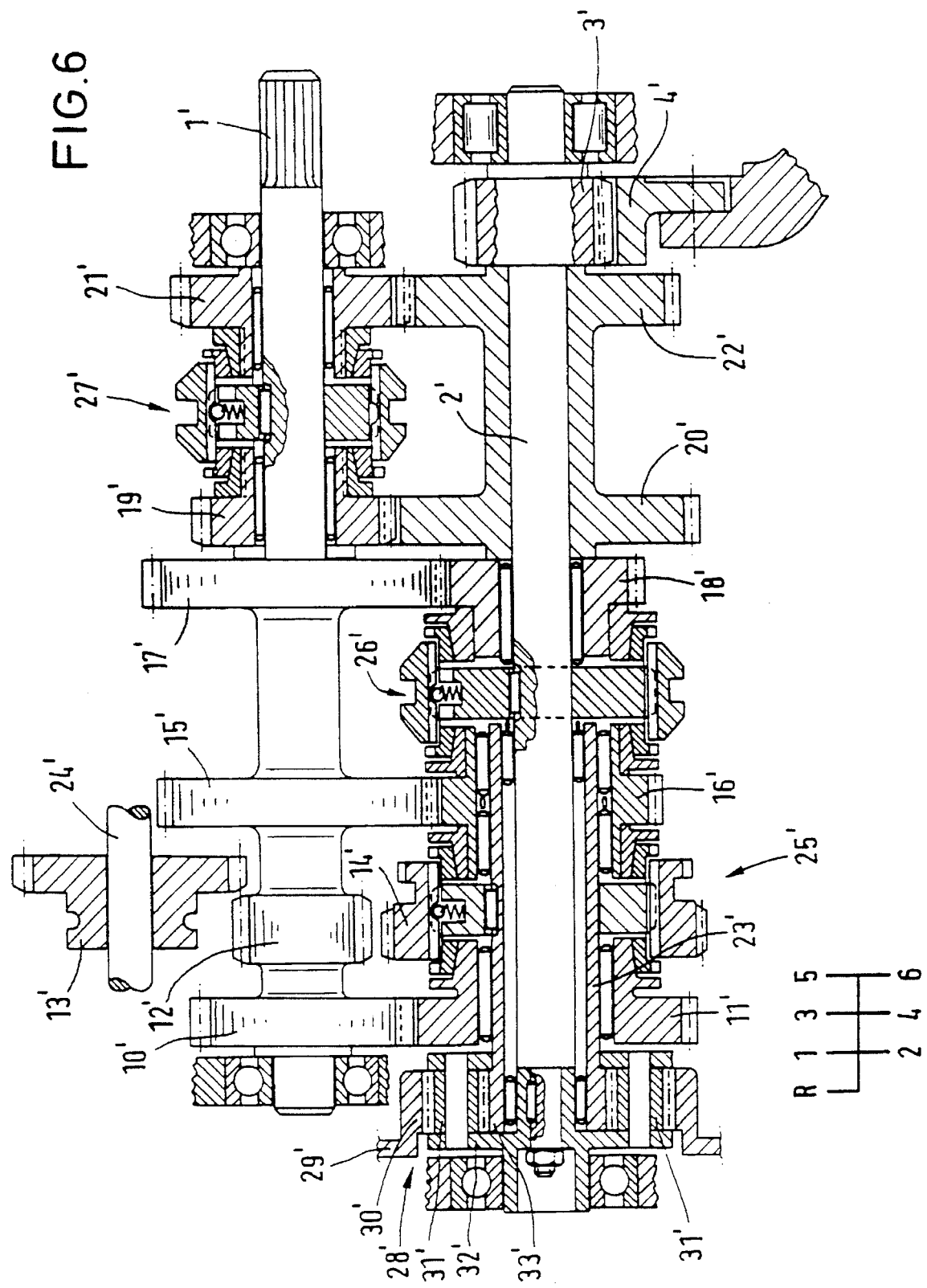
FIG. 6 is a schematic development of one embodiment of the transmission in accordance with the invention for an automobile with six forward and one reverse gears.

In the constructional form of the gearbox in accordance with FIG. 1 shown in FIG. 6 the same reference symbols are used as in FIG. 1, but for clarity are distinguished by a prime.

Since the construction and manner of functioning have already been explained in connection with FIG. 1, there is no need to explain FIG. 6 in more detail: it serves merely to show the way in which the loose pinions and gears are arranged relative to their shafts and the way in which the sleeve shaft 23' carrying the sun gear 30' can be disposed.

The transmission design shown by way of example in the embodiment can, of course, be modified in many ways, and is not intended to imply any limitations in respect of the application of the planetary gear unit in connection with the higher reduction ratio gears.

What is claimed is:

1. A transmission with a planetary reduction gear unit, for automobiles, comprising:

an input shaft;

an output shaft disposed substantially parallel to the input shaft;

an intermediate shaft substantially coaxial with the output shaft;

multiple pairs of pinions and gears, the members of each pair being in continual mutual meshing engagement, a first member of each pair supported on the input shaft, a second member of each pair supported on one of the output driven by a pinion-gear pair and driven by ;

a planetary gear unit including a ring gear fixed against rotation, a sun gear driven by a pinion-gear pair and drivably connected to said intermediate shaft, a pinion carrier driveably connected to the output shaft; and means for releasably connecting a member of each pinion-gear pair, respectively, to one of the input shaft, output shaft and intermediate shaft, including a first releasable connecting means located on the intermediate shaft releasably connectable to a first pinion-gear pair member carried on the intermediate shaft, and a second releasable connecting means located on the output shaft releasably connectable to said first pinion-gear pair carried on the intermediate shaft.

2. A transmission according to claim 1, wherein a second pinion-gear pair member is a carried on the output shaft and is releasably connected to said second releasable connecting means.

3. A transmission according to claim 2, wherein a third pinion-gear pair member is a carried on the intermediate shaft and is releasably connected to said first releasable connecting means.

4. A transmission according to claim 3, wherein a third releasable connecting means is carried on the input shaft.

5. A transmission according to claim 4, wherein said third releasable connecting means is drivably connectable to a member of two pinion-gear pairs.

6. A transmission according to claim 5, wherein said first releasable connecting means is releasably connected to a reverse driving means.

* * * * *